United States Patent [19]

Bolt

[11] 4,416,946
[45] Nov. 22, 1983

[54] HIGH STABILITY POLARIZER

[75] Inventor: Lawrence Bolt, Van Nuys, Calif.

[73] Assignee: American Hoechst Corporation, Somerville, N.J.

[21] Appl. No.: 365,430

[22] Filed: Apr. 5, 1982

[51] Int. Cl.³ .................... B32B 27/00; B32B 27/08
[52] U.S. Cl. .................................... 428/421; 264/1.3; 350/397; 350/398; 428/422; 428/500; 428/516
[58] Field of Search ............... 428/421, 1, 422, 500, 428/516; 350/397, 398; 264/1.3

[56] References Cited

U.S. PATENT DOCUMENTS

| | | | |
|---|---|---|---|
| 2,572,315 | 10/1951 | Campbell | 350/398 |
| 3,621,085 | 11/1971 | Ichikawa | 264/1.3 |
| 3,833,289 | 9/1974 | Schuler | 350/397 |
| 4,025,688 | 5/1977 | Nagy et al. | 428/1 X |
| 4,047,804 | 9/1977 | Stephens | 428/421 X |

*Primary Examiner*—Thomas J. Herbert, Jr.
*Attorney, Agent, or Firm*—Richard S. Roberts

[57] ABSTRACT

The invention relates to a highly hydrolytically stable polarizer element having a moisture barrier flurocarbon film as its supporting substrate.

6 Claims, No Drawings

HIGH STABILITY POLARIZER

BACKGROUND OF THE INVENTION

This invention relates to an improved light-polarizing film and also to the production thereof.

A conventional light-polarizing film is produced by impregnating a film of polyvinyl alcohol with an aqueous solution of a light-polarizing element (such as iodine or a dichroic dye) or an agent forming a dichromic light-polarizing element and then thermally stretching the film several times the length so that high molecular micelles are unidirectionally oriented. However, the base material in this case is of a water-soluble high molecular weight substance, and therefore the resulting light-polarizing film is low in the resistance to water so that it deteriorates even with the moisture in air.

U.S. Pat. No. 4,025,688 teaches the manufacture of light polarizers by providing a film of polyvinyl alcohol with a dichroic stain such as iodine. The polarizer may optionally be supported by a layer of cellulose acetate butyrate bonded to the polarizer through a hydrophilic tie coat.

A problem with this type of polarizer is it demonstrates poor hydrolytic stability. That is, its polarizing efficiency, or ability to polarize light, decreases over time as heat and humidity increases. This tendency is disadvantageous for such uses as in liquid crystal displays especially for automobile instruments which must function in a wide range of heat and humidity conditions.

In the production of polarizing sheets, a film of a substrate is laminated to a film of oriented polyvinyl alcohol. This laminate is then passed through an aqueous staining bath containing iodine and one or more iodide salts to tint the polyvinyl alcohol film. Stabilizing treatments may then be employed.

The present invention provides an improved hydrolytically stabilized polarizer employing an optically advantageous, high moisture barrier fluorocarbon film substrate.

SUMMARY OF THE INVENTION

The invention provides an improved polarizer element which comprises a stained, light polarizing polyvinyl alcohol film which is adhered on one or both sides to a thin, flexible, integrated sheet of a fluorocarbon film. Optionally, an additional transparent film such as one of a polyester, for example polyethylene terephthalate, or cellulose acetate butyrate is disposed between said fluorocarbon and said polyvinyl alcohol films.

DETAILED DESCRIPTION OF THE PREFERRED EMBODIMENT

A polarizing element is typically made from two to three mil cast polyvinyl alcohol (PVA) film. This film is linearly stretched 300 to 500% by means of pull rolls and a heat source such as an oven, hot air knife or hot bar. In its stretched form the PVA film is joined for example via lamination to a substrate such as the fluorocarbon polymer material which will be described hereinafter.

This laminate is then run through an iodine bath where the iodine quickly diffuses into the PVA film and affixes to the thin, parallel molecules formed in the stretching operation. Excess iodine is washed away and the stained film is passed through a boronic stabilizing solution typically comprising boric acid and/or borax, which imparts some chemical and moisture resistance to the stained surface by cross-linking the PVA. Excess stabilizing solution is washed off and the film is dried and coiled or sheeted.

In an alternate embodiment the PVA film is adhered directly to a transparent film such as cellulose acetate butyrate or a polyester film, such as polyethylene terephthalate or more particularly a uniaxially stretched, preferably transversely uniaxially stretched polyethylene terephthalate film. This intermediate film is then applied to a film comprising a highly moisture impervious fluorocarbon. In this embodiment, a bonding agent is applied between the films during lamination. Such agents may include water, an aqueous PVA solution, an aqueous polyurethane dispersion or mixtures thereof, among others. The fluorocarbon sheet is adhered to this structure via an adhesive system such as a pressure sensitive adhesive. In the embodiment employing the fluorocarbon film as a primary substrate, thermosetting epoxies are particularly suitable.

The preferred fluorocarbon film is a polychlorotrifluoroethylene and may be obtained as Aclar$^R$ film from the Allied Corporation. Other useful fluorocarbon polymers can include fluorinated ethylene propylene, ethylene-chlorotrifluoroethylene, polytetrafluoroethylene, polyvinylidene fluoride, ethylene tetrafluoroethylene and perfluoroalkoxy resins.

In the preferred embodiment, the staining bath is aqueous and contains sufficient iodine to impart the desired stain to the polyvinyl alcohol film. Typically this amount ranges from about 0.1% to 2% by weight of the solution. The bath also contains an iodide salt, such as potassium, sodium, lithium or hydrogen iodide which promotes the acceptance of the colored iodine stain into the polyvinyl alcohol. The iodide salt may be present in an amount of from about 1% to about the saturation point of the solution. A more preferred range is from about 10% to about 25%. The optimum quantity can be determined by the skilled artisan. One preferred quantity is about 21% potassium iodide. Preferably the solution may be maintained at a temperature of from about 95° to about 105° F. One may optionally include other ingredients in the staining bath, such as alcohols, to promote staining.

The stained film may next be introduced into a boronic stabilizing bath such as is well known in the art. A typical stabilizing bath contains an aqueous solution of 3 to 10% borax and 10 to 20% boric acid in parts by weight. A typical dwell time is about 90 seconds. The film may then be dried by air or in an oven.

In the preferred embodiment, the fluorocarbon film has a thickness in the range of from about ¾ to about 5 mils and has a moisture vapor transmission rate (MVTR) on the order of less than about 0.20, preferably 0.10 g/100 in.$^2$/24 hours at 90° F. and 100% relative humidity. Thus a film 1 mil thick of Aclar with a MVTR of 0.025 2/100 in.$^2$/24 hours and a 5 mil film of Teflon fluorinated ethylene propylene with an MVTR of about 0.4 g/100 in.$^2$/24 hours/mil produce equivalent results. Such films must also demonstrate low haze, good resolution and a minimum of optical defects such as pits and occlusions.

The following non-limiting examples serve to demonstrate and illustrate the invention.

EXAMPLE 1

A polarizer is formed by laminating a cast sheet of polyvinyl alcohol to a sheet of cellulose acetate butyrate which is then stained in an iodine containing bath and stabilized in a solution of boric acid and borax to form a coated control element having a 47% light transmission. A sample of this element is further adhered to a 1 mil sheet of polychlorotrifluoroethylene via a pressure sensitive adhesive (Mac Tac$^R$ IF 2057). The polarizing efficiency of each sample is then measured over time when maintained at 70° C. and 95% RH with the following results:

|  | % E ± 2 AT X HRS. | | |
|---|---|---|---|
| MATERIAL | 0 | 4 | 27 |
| Laminate | 90 | 90 | 83 |
| Control | 90 | 62 | 0 |

Another control sample having a 46% light transmission yields the following polarizing efficiency under the same conditions.

|  | % E ± 2 AT X HRS. | | |
|---|---|---|---|
| MATERIAL | 0 | 17 | 40 |
| Laminate | 97 | 97 | 94 |
| Control | 97 | 47 | 0 |

When a polyethylene terephthalate film is substituted for the cellulose acetate butyrate to form a product having a 42% transmission, the following results are noted:

|  | % E ± 2 X HRS. | | |
|---|---|---|---|
| MATERIAL | 0 | 15 | 27 |
| Laminate | 99 | 99 | 99 |
| Control | 99 | 86 | 54 |

EXAMPLE 2

A preformed 41.7% transmission polarizer with a polyethylene terephthalate substrate is laminated with a solution cast pressure sensitive adhesive to four barrier films and tested. Materials and hydrolytic stability results are shown below.

| BARRIER FILM TRADE NAME | BARRIER FILM CHEMICAL CLASS | BARRIER FILM THICKNESS .001" | % E ± 5 AFTER X HRS. AT 70° C./95% RH | | |
|---|---|---|---|---|---|
|  |  |  | 0 | 73 | 118 |
| Aclar ® 33C | Polychlorotri-fluoroethylene | 1 | 99 | 94 | 80 |
| Halar ® | Ethylene chlorotrifluoro-ethylene | 5 | 99 | 92 | 86 |
| Teflon ® PFA | Perfluoro-alkoxy | 5 | 99 | 91 | 83 |
| Teflon ® FEP | Fluorinated ethylene propylene | 5 | 99 | 89 | 76 |
| Control | NA | NA | 99 | 80 | 50 |

EXAMPLE 3

A PVA polarizing element is stretched 360% and laminated to a 5 mil sheet of Aclar$^R$ 33C with a thermosetting epoxy mixture of 20% by weight Corcat P-18$^R$ polyethylenimine and 80% by weight Epon$^R$ 828 epoxide resin. This lamination is cured under tension for two minutes at 305°±10° F. This lamination is then wet processed to produce a 48% transmission Aclar$^R$ analogue of a CAB or polyester polarizer. This polarizer provides a very hydrolytically stable polarizer: polarization efficiency after 20 hours conditioning at 70° C. and 95% relative humidity decreases from 92% to 82%. A 48% transmission CAB or PET analogue degrades to 82% polarization efficiency in only 3–4 hours at 70° C./95%RH. This lamination withstands boiling water for more than 15 minutes with no delamination.

What is claimed is:

1. A polarizing element which comprises a sheet of a stained polyvinyl alcohol film which is adhered on one side thereof to a flexible transparent fluorine containing sheet, said fluorine containing sheet consisting essentially of a material selected from the group consisting of ethylene-chlorotrifluoroethylene, polytetrafluoroethylene, polyvinylidene fluoride, ethylene tetrafluoroethylene, perfluoro alkoxy materials, fluorinated ethylene propylene, and polychlorotrifluoroethylene.

2. The element of claim 1 further comprising a film of an additional flexible, transparent sheet material adherently disposed between said stained polyvinyl alcohol film and said fluorine containing sheet.

3. The element of claim 2 wherein said additional sheet material comprises polyester or cellulose acetate butyrate.

4. The element of claim 1 or 2 wherein said fluorine containing comprises polychlorotrifluoroethylene.

5. The element of claim 1 or 2 further comprising an additional flexible transparent fluorine containing sheet adhered to the opposite side of said polyvinyl alcohol film.

6. The element of claim 5 further comprising a second flexible transparent sheet material adherently disposed between said stained polyvinyl alcohol film and said additional flexible transparent fluorine containing sheet.

* * * * *